(12) United States Patent
Van Rotterdam et al.

(10) Patent No.: US 9,330,122 B2
(45) Date of Patent: *May 3, 2016

(54) SYSTEM AND METHOD OF DYNAMIC DATA OBJECT UPGRADES

(71) Applicant: EMC Corporation, Hopkinton, MA (US)

(72) Inventors: Jeroen Van Rotterdam, Berkeley, CA (US); Mark Polman, Rotterdam (NL)

(73) Assignee: EMC Corporation, Hopkinton, MA (US)

( * ) Notice: Subject to any disclaimer, the term of this patent is extended or adjusted under 35 U.S.C. 154(b) by 237 days.

This patent is subject to a terminal disclaimer.

(21) Appl. No.: 14/061,386

(22) Filed: Oct. 23, 2013

(65) Prior Publication Data

US 2014/0122420 A1    May 1, 2014

Related U.S. Application Data

(63) Continuation of application No. 13/251,175, filed on Sep. 30, 2011, now Pat. No. 8,612,405.

(51) Int. Cl.
*G06F 17/30* (2006.01)
*H04L 12/58* (2006.01)

(52) U.S. Cl.
CPC .... *G06F 17/30309* (2013.01); *G06F 17/30545* (2013.01); *G06F 17/30575* (2013.01); *G06F 17/30902* (2013.01); *H04L 12/58* (2013.01)

(58) Field of Classification Search
CPC ............ G06F 17/30309; G06F 17/30545; G06F 17/30575; G06F 17/30581; G06F 17/30902

USPC .......... 707/695, 609, 610, 625, 638, 639, 694
See application file for complete search history.

(56) References Cited

U.S. PATENT DOCUMENTS

| | | | |
|---|---|---|---|
| 6,138,119 A | 10/2000 | Hall et al. | |
| 6,209,128 B1 | 3/2001 | Gerard et al. | |
| 7,359,907 B2 | 4/2008 | MacLeod et al. | |
| 7,401,085 B2 * | 7/2008 | Mackay | G06F 17/30581 707/999.001 |
| 7,493,335 B2 | 2/2009 | Gold et al. | |
| 7,496,596 B2 | 2/2009 | Li et al. | |
| 7,730,028 B2 | 6/2010 | Tysowski et al. | |

(Continued)

FOREIGN PATENT DOCUMENTS

| | | |
|---|---|---|
| CN | 1738254 | 2/2006 |
| CN | 101154234 | 4/2008 |
| CN | 101183361 | 5/2008 |

OTHER PUBLICATIONS

Galante R D M et al: "Temporal and versioning model for schema evolution in object-oriented databases", Data & Knowledge Engineering, Elsevier BV, NL, vol. 53, No. 2, May 1, 2005, pp. 99-128, XP027783935, ISSN: 0169-023X [retrieved on May 1, 2005].

*Primary Examiner* — Dangelino Gortayo
(74) *Attorney, Agent, or Firm* — Van Pelt, Yi & James LLP

(57) ABSTRACT

A method, article of manufacture, and apparatus for managing a cloud computing environment. In some embodiments, this includes modifying an object or a component of an object at runtime and storing the modified object or modified component of an object in a storage device. In some embodiments, components of an object such as data structures are modified. In some embodiments, objects may have more than one version.

15 Claims, 5 Drawing Sheets

(56) References Cited

U.S. PATENT DOCUMENTS

| | | | |
|---|---|---|---|
| 7,792,800 B1 | 9/2010 | Carson, Jr. et al. | |
| 7,853,621 B2 | 12/2010 | Guo | |
| 8,095,517 B2 * | 1/2012 | Sandoval | H04L 63/102 707/695 |
| 8,166,101 B2 * | 4/2012 | Shah | G06F 17/30595 709/203 |
| 8,250,119 B2 | 8/2012 | Zázrivec et al. | |
| 8,255,790 B2 | 8/2012 | Francker et al. | |
| 8,307,016 B2 | 11/2012 | Szyperski et al. | |
| 8,341,594 B1 | 12/2012 | Monteiro et al. | |
| 8,370,474 B1 * | 2/2013 | Reeves | H04L 29/00 707/691 |
| 8,386,423 B2 * | 2/2013 | Parham | G06F 17/30575 707/610 |
| 8,452,817 B1 | 5/2013 | Srinivasan et al. | |
| 2002/0169777 A1 | 11/2002 | Balajel et al. | |
| 2004/0172462 A1 | 9/2004 | Iterum et al. | |
| 2006/0085451 A1 | 4/2006 | Pal et al. | |
| 2006/0117057 A1 | 6/2006 | Legault et al. | |
| 2006/0195460 A1 | 8/2006 | Nori et al. | |
| 2006/0259458 A1 | 11/2006 | Hunter et al. | |
| 2007/0094310 A1 | 4/2007 | Passey et al. | |
| 2008/0052325 A1 | 2/2008 | Vincent, III | |
| 2008/0077632 A1 | 3/2008 | Tysowski et al. | |
| 2008/0098037 A1 | 4/2008 | Neil et al. | |
| 2008/0168109 A1 | 7/2008 | Gaurav et al. | |
| 2009/0307278 A1 | 12/2009 | Grossbart et al. | |

* cited by examiner

SYSTEM AND METHOD OF DYNAMIC DATA OBJECT UPGRADES

CROSS REFERENCE TO RELATED APPLICATIONS

This application is a continuation of co-pending U.S. patent application Ser. No. 13/251,175, entitled SYSTEM AND METHOD OF DYNAMIC DATA OBJECT UPGRADES filed Sep. 30, 2011 which is incorporated herein by reference for all purposes.

FIELD OF THE INVENTION

This invention relates generally to data systems, and more particularly to systems and methods for organizing and upgrading data in data systems.

BACKGROUND OF THE INVENTION

Increasingly, there is a demand for increasing availability and uptime of systems for the storage, warehousing, and analysis of data.

Frequently, when changes are required to a data system, such as a database, and particularly when changes are required to the manner in which data is stored or organized, or additions are made to the format of data, the system must be taken offline, brought down, or otherwise temporarily made unavailable to users. For example, if a database schema needs to be updated or upgraded, this has typically required downtime for the entire data repository.

Users desiring access to the data system are frustrated by the unavailability of the data system, for example, they frequently need access to the data system to perform their job responsibilities. Downtime is particularly problematic for distributed and "cloud"-based repositories, as it is difficult for cloud providers to schedule downtime acceptable to all their customers or users, for example. More generally, most customers of cloud-based services and data systems, and particularly enterprise customers, may expect substantially continuous availability with virtually no downtime.

There is a need, therefore, for an improved method, article of manufacture, and apparatus for making changes to the organization of data in data systems, and for making additions to the data stored in data systems, while minimizing if not eliminating the amount of time that the system is unavailable to users.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
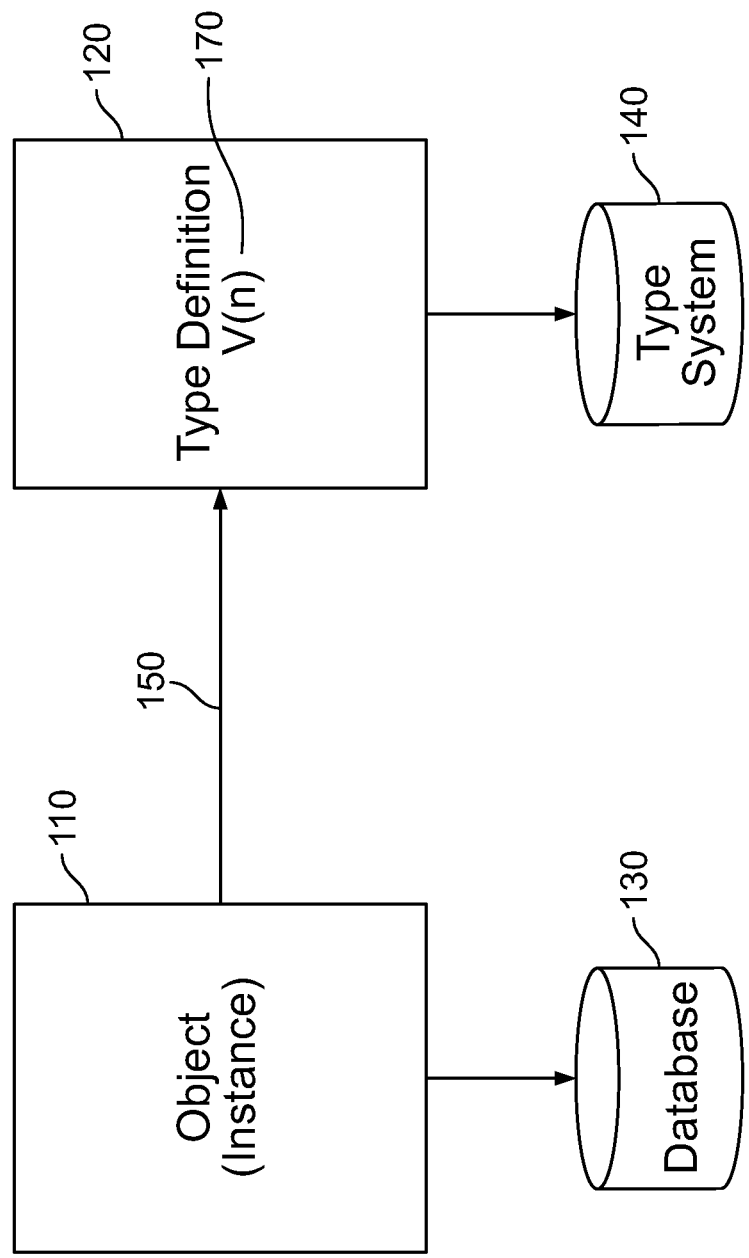
FIG. 1 illustrates a data system in accordance with some embodiments.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard-coded in hardware or in firmware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, and particularly data objects, in analog, digital, or other form. Although terms such as document, file, object, etc. may be used by way of example, the principles of the invention are not limited to any particular form of representing and storing data or other information; rather, they are equally applicable to any manner of representing information. Similarly, while reference may be made herein to a database, data system, document storage system, data repository, or similar systems or data collections; reference to one type of these systems should be taken to refer to all such suitable systems unless explicitly stated otherwise.

Traditional databases, or content management systems, have relatively rigid definitions of data objects. Conventional data objects provided or used with such databases or systems typically inherit lots of metadata and functionality, even if much of this metadata and functionality is neither required nor used. Moreover, because of these inflexible definitions and unused metadata and functionality, while the offered functionality is generally inflexible and unchangeable, the total cost of ownership per object is relatively high.

Embodiments of the invention herein allow for the updating, upgrading, or other amendment or modification (generally herein, "updating") of data structures, or for the updating of policies for data structures, on the fly, without taking the data system down or offline. In certain embodiments, developers may be allowed to choose an update policy for an individual object. In other embodiments, a developer may be allowed to choose an update policy for a set of objects. Alternatively, in certain embodiments, a developer may be allowed to choose an update policy for an entire repository. In some embodiments, the data model change, or upgrade of the selected object(s), is executed while the system continues operation and thus the system remains available to users without material interruption.

Embodiments of the present invention provide a way to dynamically change or upgrade databases with persistent objects, based on policies. Further embodiments of the invention provide a system to set policies for upgrade objects "on the fly," without taking the database offline for upgrading. These policies allow developers to choose an upgrade policy appropriate for the situation, for example, an upgrade may be applied for an individual object. Alternatively, an upgrade may be applied to a set of objects. In some embodiments and uses, an upgrade may be applied to an entire data repository; the data model change or upgrade of the selected object(s) being executed while the system continues operation. In this manner, embodiments of the present invention allow for continuous operation of applications even if the data structures used by the application and data repository need to change, e.g. such data structures may require changes because of a corresponding change in a business process, and correspondingly in an application based on this business process, that accesses such data structures.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

A data object may be implemented in the form of an XML document. For example, a "document" object may be created, in some embodiments relating to a scanned paper document, a data file, or some other actual, virtual, or electronic document or file. This object of type "document" may have component data structures, as well as component methods and functions. These component methods and functions may be instances of other methods and functions available to other objects, or may be unique or customized for an object such as the "document" object. Objects such as the "document" object may conveniently be implemented, described, or instantiated in the form of an XML document, with the appropriate provision of tags in the XML document. In some embodiments, data aspects, traits, or other cross-cutting or multi-object data structures may be associated with a data object, for example by implementation in or reference by an XML document. These data objects may be conveniently stored in an object-oriented or other database, for example one optimized for storage of XML documents if the objects are implemented in such documents. The xDB databases distributed by the assignee of the instant invention may suitably be employed in an embodiment for the storage of XML documents implementing data objects.

For example, an object of type "document" may be created with a "content" data structure and an "authoring" data structure. The object holds data related to some file, an instance of the "document" object, that may be stored elsewhere in the system, for example in native, binary large object ("BLOB"), well-known binary data format, or MIME format. In some embodiments, the "content" data structure may group data concerning that file (MIME type, size, file reference, file name, or file system metadata, for example), while the "authoring" data structure may be associated with data concerning the authoring process of the file (last modified date, last modifier, creation date, creator, or application metadata, for example).

Data objects may be modified or added at runtime. An object may have attributes that define a data model, and may also expose services or methods. The manipulation of objects during runtime allows for a flexible database model without the need to define a rigid database structure upfront. Embodiments may further allow for the addition, or modification, of objects on-the-fly without interrupting the continuous use the storage system or database. Other embodiments may limit the interruption of the continuous use to a desired amount, including zero interruption or downtime.

As objects define a data model and expose or implement services or methods, it may be necessary from time to time within an organization to change the data model or associated services or methods to reflect changes, updates, or corrections in the business processes of the owner of a data system or database and the associated applications that are used to operate on and access the data system. These changes may involve, for example, adding attributes to an object that previously was empty. Alternatively, existing objects may be changed to reflect changes to business processes or applications, for example by changing attributes or type, or by adding data structures, fields, methods, or services.

Accordingly, embodiments may provide for the updating of an object, and a version number for the object may be incremented serially when a new version of an object is implemented or deployed in order to assist in the maintenance of a record or log of what changes were made at what time and to otherwise be able to replicate results or states as necessary in the future. As new versions of objects are developed or made necessary by the pertinent business processes he administrator of a data system or database may wish to rollout a new version of an object or without interrupting the continuous use of the data system or database using the object.

Embodiments may provide a database or data system administrator or operator with the ability to describe how the updates to the object should be effected, so that the administrator may dictate a manner of effecting updates that is consistent with the business processes, organizational policies, regulatory or legal framework, and any other relevant criteria or need of the organization. Embodiments provide for a number of predefined alternative update deployment models, or the creation of custom deployment models or systems.

In certain embodiments, the administrator implementing an update on a data system may be allowed to define the scope and timing of the update in terms of to which objects to the update is propagated. For example, the administrator may elect to have an update effected with respect to a single data object, a group of data objects, or even the entire data repository.

FIG. 1 illustrates a data system in accordance with some embodiments. The illustration includes an aspect of the system to update objects for a data system according to some embodiments. An instantiation of an object 110 may contain zero or more instantiations of object types 120. This object 110 with its associated type definition(s) 120 may be stored in a database 130, such as an XML object-oriented database, for example, in a way which persists the object 110 and its component definitions 120, for example, in an object-to-database mapping.

Object 120 may be an instantiation of type definition 120, that is, its features may be dictated by the features called for by the type definition 140 with which object 110 is associated by virtue of association 160. Type definition 120 may be designated has having a version V(n) 170, in which n may be an integer incremented by 1 each time a new version of the type definition 120 is updated, upgraded, or otherwise modified, for example by the modification of data model, data types, services, methods, functions, or the like. The different version numbers V(n) 170 assigned to serial versions of type definitions 120 make one type definition distinguishable from other earlier or later type definitions 120 having the same name and being instantiated in one or more objects 110 that contain or will instantiated the type definition 120 in question. Generally, a type definition may in some embodiments describe constraints for the data types, functions, classes, and other attributes of the object 110.

Some embodiments provide that these one or more type definitions 120 may be stored in a type system database 140. Type system database 140 may be, for example, a component of an object-oriented database, and may further be the sole component of such database. Some embodiments provide that the type system database 140 is an XML database for storage of XML documents in type system database 140, by which the XML documents hold or persist the various one or more type definition versions 120. The currently-operative version of the type definition 120 may vary, for example, by which tenant is using the application or data repository, in the embodiment of the invention in a multi-tenant or cloud implementation.

Figure 2:
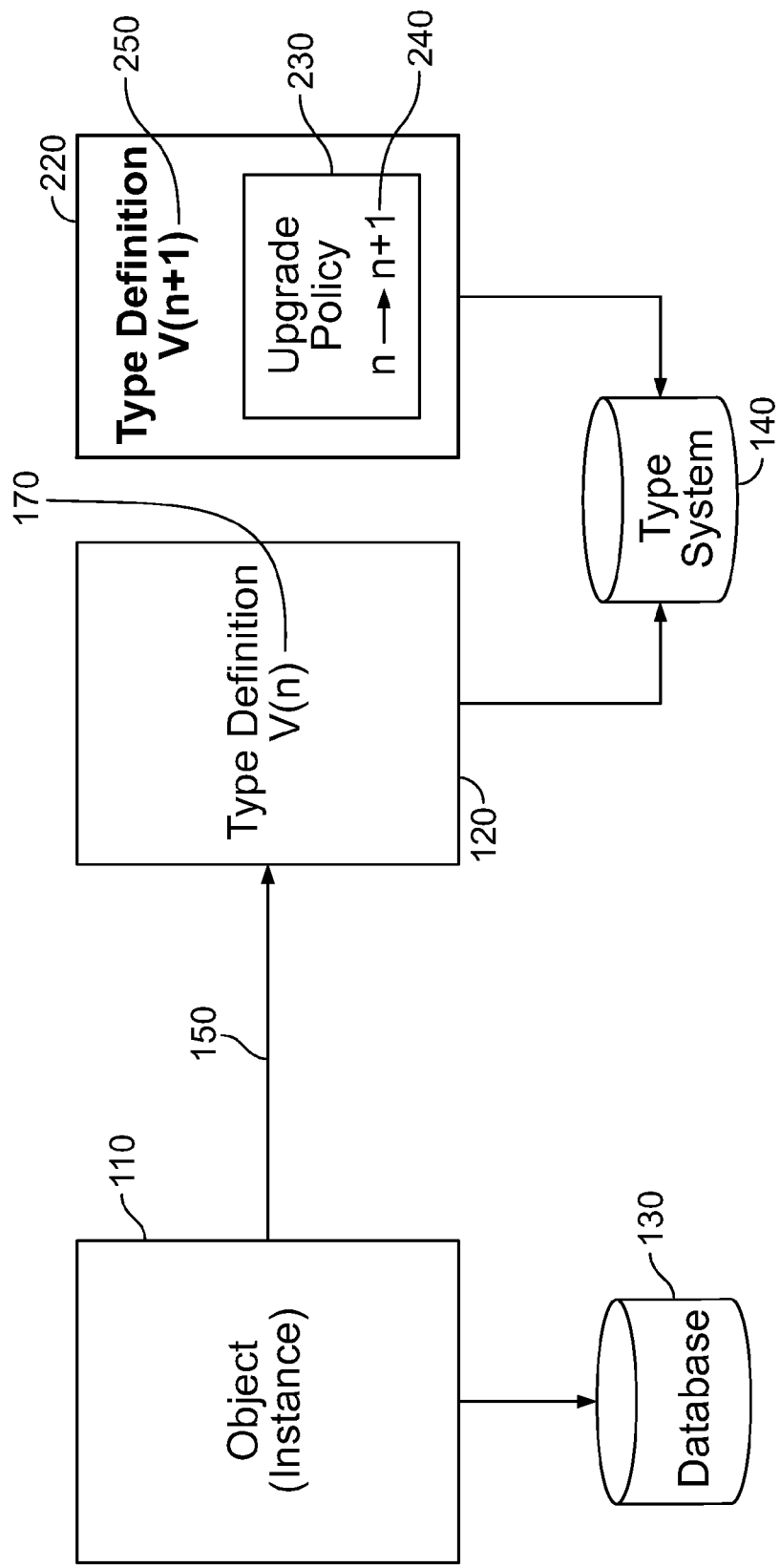
FIG. 2 illustrates a data system in accordance with some embodiments.

FIG. 2 illustrates a data system in accordance with some embodiments. It further illustrates an embodiment of the invention by which a type definition 120 may be changed as dictated by business operations or processes, and the changes to the type definition 120 may be persisted as a new version V(n+1) 220 of type definition 140, by storing type definition V(n+1) 220 as such in type system 140. In one embodiment of the instant invention, a system is provided by which a data repository administrator may change a type definition 120 by uploading a new version 220 of the type definition into type system 140.

Some embodiments providing for upgrade policies further provide that a type definition 220 may be instantiated with an upgrade policy 230 by which the data repository administrator instructs the data repository to implement the upgrade or change from type definition V(n) 140 to type definition V(n+1) 220 with respect to existing or future instances of the same object instantiated in object 110. Upgrade policy 230 may be contained in type definition V(n+1) 220 or otherwise associated with type definition 220 within type system 140.

By providing for a particular upgrade policy 230, embodiments of the invention allow an administrator to reduce the impact of type definition changes by dictating that the changes occur in a manner that will consume the least resources and cause the least inconvenience, within the constraints of the business process logic or other application requirements applicable to the object and repository.

In some embodiments, the invention provides for the implementation of upgrade policies that permit the dynamic modification of part of, or an entire, persistent object stored in a database. Embodiments of the invention provide for a system by which policies are set for upgrades of object types, which policy can be applied to an individual object, a set of objects, or the entire data repository and all its constituent objects. The data model change or upgrade or other modification of the selected object or objects, in accordance with the one or more policies, may be effected without taking the data repository offline.

In some embodiments, a type definition V(n) 120 being applied to or embodied in a particular object instance 110 may be left unchanged in trait instance 110 for some period of time, even though the administrator has provided one or more upgraded type definitions 220 V(n+1) in the meantime. Upgrade policy 230 may, for example, provide that type definition V(n) 120 as instantiated in object 110 should be changed to upgraded type definition V(n+1) 220 synchronously upon access by a user, i.e. only when object 110 is retrieved by a user following a search of the database. Under this access policy, the object 110 should be upgraded to use or comply with object definition V(n+1) 220 the next time the object 110 is accessed. Alternatively, type definition V(n) 120 may be upgraded according to an upgrade policy when object 110 is responsive to (i.e. is a "hit" with respect to) a search of the database, even if neither object 110, nor its associated data (such as a document corresponding to metadata stored in or as object 110), respectively, is retrieved or viewed by the user.

Alternatively, an embodiment may provide for, or allow for configuration providing for, an upgrade of the object asynchronously upon access. For example, the upgrade of the object according to the type definition may be scheduled to occur in the background, as computing resources permit or at an optimum or convenient time, at some time after the object is requested, or is accessed.

Furthermore, embodiments may provide for the upgrade of an object's type definition V(n) 120 to V(n+m) directly where (n+m)>(n+1), that is, where the type definition V(n) 120 for an object 110 has not been previously upgraded despite more than one type definition upgrade (e.g. type definition upgrades 220 and 320) being promulgated by the administrator, for example in the case where the conditions for an upgraded type definition 220 to be applied to object 110 via upgrade policy 240 have not been met since upgraded type definition 220 was created (for example, object 110 had not been accessed, in an "update on access" configuration).

Figure 3:
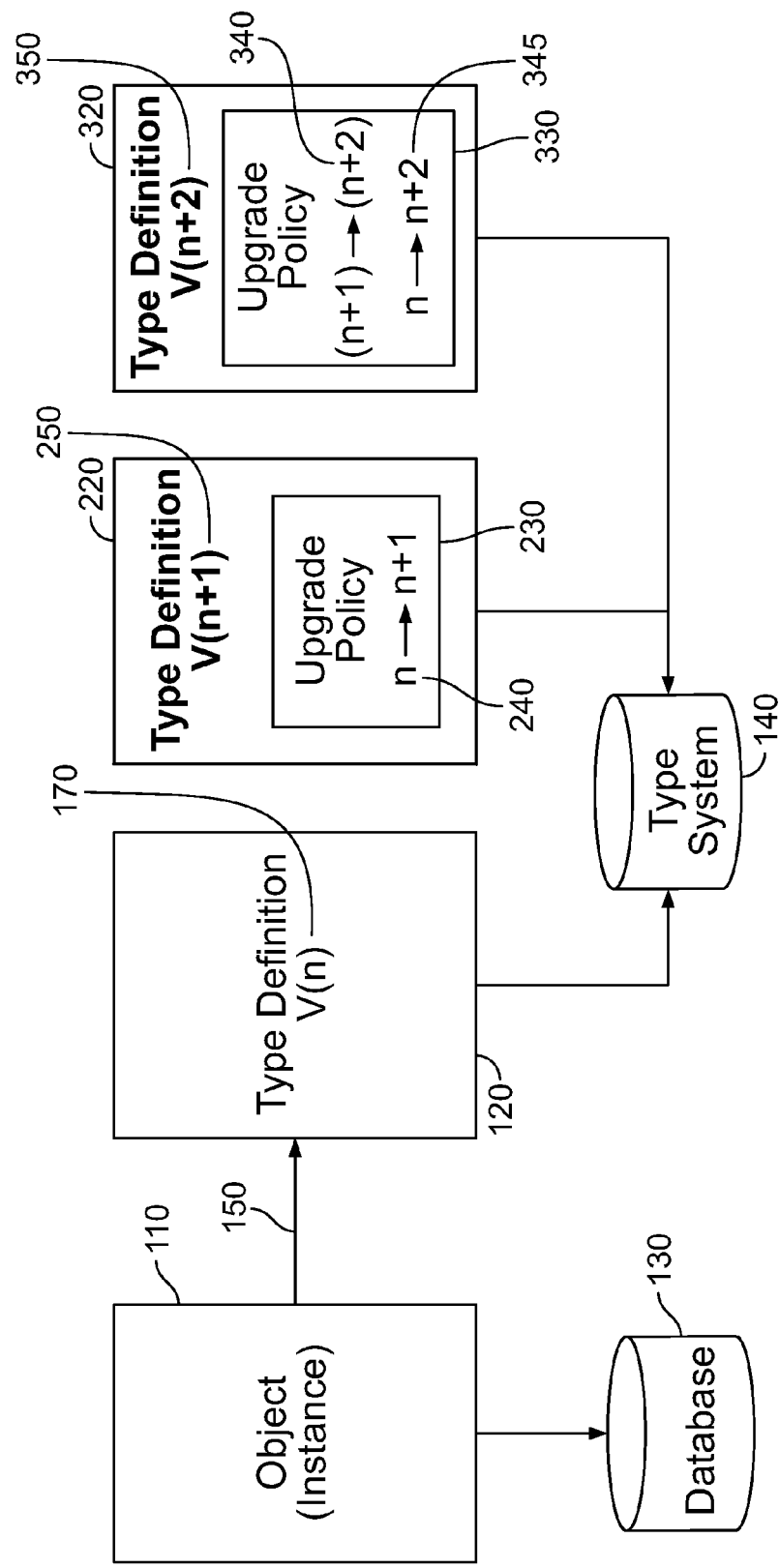
FIG. 3 illustrates a data system in accordance with some embodiments.

FIG. 3 illustrates a data system in accordance with some embodiments, and further illustrates a specific instance of this general case, a scenario in an embodiment when an upgrade policy for a type definition 120 is provided directly from an earlier type definition 120 to a later type definition 320, in the event that the conditions for the implementation of type definition upgrade policy n→n+1 240 were not met before the promulgation of type definition V(n+2) 320. As does type definition 220, type definition V(n+2) 320 has an upgrade policy component 330 having provision for type definition upgrades from n+1→n+2 340 in the event that the type definition for an object instance 110 has been upgraded from V(n) to V(n+1) since the time that type definition upgrade 220 had been promulgated by the administrator. However, this embodiment further provides that upgraded type definition 330 has an additional upgrade policy 330 component 345, providing for upgrades directly from type definition 120 to type definition 320. As were type definition 120 and upgraded type definition 220, type definition V(n+2) 320 may be stored in type system or database 140. This "direct" upgrade policy 345 from type definition V(n) 120 to type definition V(n+2) 320 without application of intervening type definition upgrade V(n+1) 220 to type 120 may be accomplished as necessary according to the business processes and other characteristics of the business process or domain served by the data repository being administered.

Other embodiments may provide for additional or alternate upgrade policies, for example a policy of upgrading a type 120 according to an upgraded type definition 420, or later upgraded type definition, in a batch process. For example, an upgrade policy may provide that a type be upgraded in the repository even though the type 120 of the object 110, has not been recently, or even ever, accessed. Further embodiments may provide for an upgrade policy which provides for upgrades of type definitions 120 as a batch process regardless of whether each object (e.g. 110) corresponding to the type definition 120 has been accessed.

An additional embodiment may modify this batch process upgrade policy by blocking access to entire objects affected by the type definition upgrade until such time that the mass upgrade of the affected objects is effected across the entire data repository or some segment of the repository. Another embodiment may provide for an upgrade policy by which certain objects 110 having a certain type definition 120 are not upgraded at any time, even though other types sharing the same type definition 120 may be changed according to one of the other upgrade policies.

Figure 5:
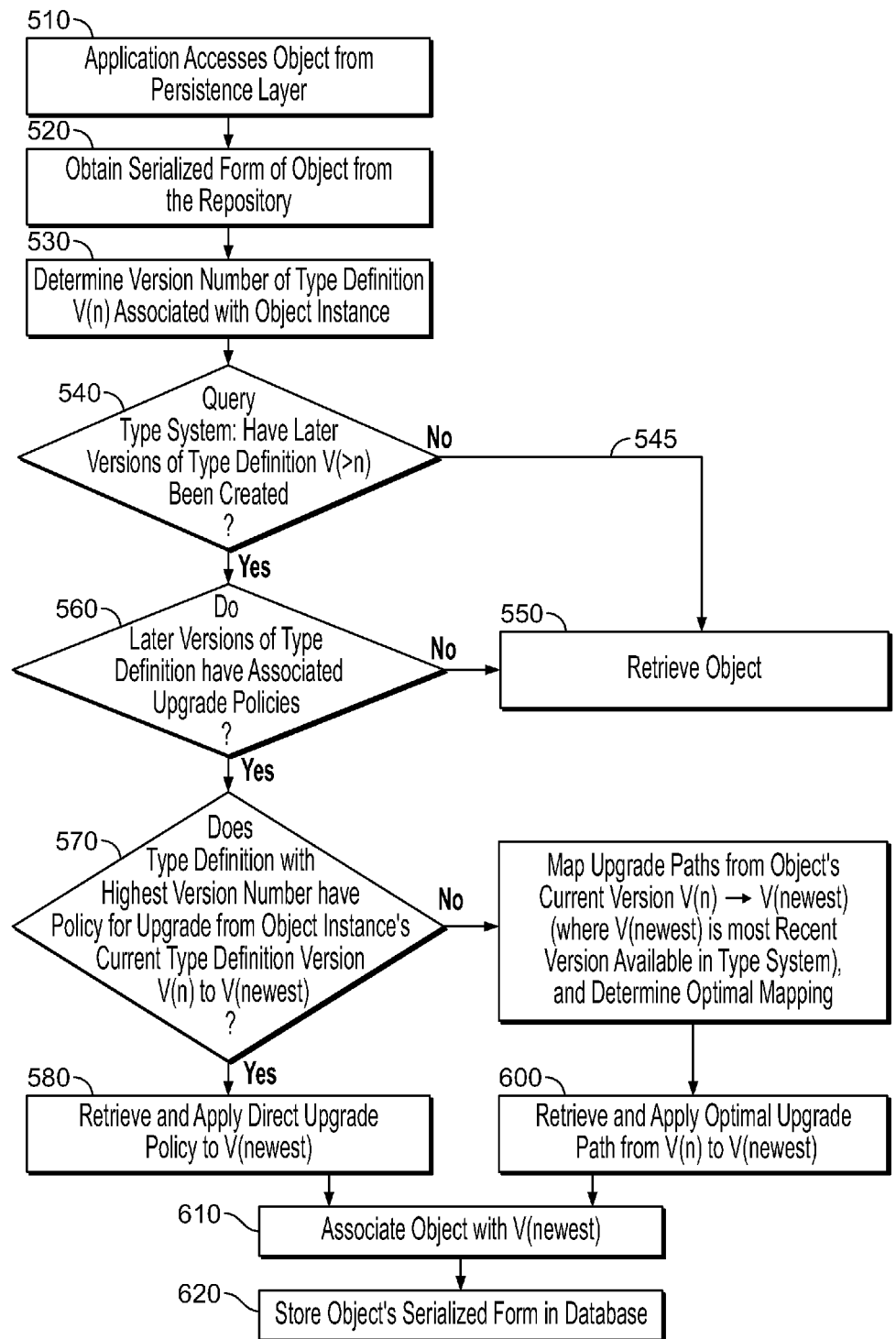
FIG. 5 is a flowchart of the upgrading of data in accordance with some embodiments.

Embodiments of the present invention may provide for a process for accessing and upgrading type definitions. FIG. 5 is a flowchart of the upgrading of data in accordance with some embodiments. In step 510, an application, such as a data processing or database application, is directed to access an object, such as object 110 of FIG. 1. The application may access a persistence layer, e.g. a database's 130 persistence layer, in order to access the object. Embodiments of the current invention may utilize the following process in order to enable the application to determine whether an upgrade is pending for the object, and if so, how the upgrade should be accomplished, e.g. whether the upgrade should be effected on-the-fly, or as a batch process. Further in step 510, the object is accessed from the persistence layer. In another step such as step 520, the serialized form of the object is received from the data repository, for example via the persistence layer or RDBMS.

In step 530, the type definition associated with the retrieved object is determined, for example by examination of the version tag applicable to the object instance or by examination of the type definition associated with the object. Some embodiments provide that the type system 140 may be queried or polled for the existence of later versions of the type definition, in step 540, i.e. typically newer type definitions have a higher version number than the version number of the current type definition associated with the object being accessed in step 510. So the existence of higher version numbers for a type definition in step 540 may generally indicate the existence of later versions. If no later versions are associated with the type definition, the object's type may be retrieved in step 550 via N ("no") branch 545.

If later versions are available, in step 560 the type definition of the later version or versions of the type definitions may be inspected, for example to determine whether there are embedded or otherwise associated upgrade policies with the later version(s). If there are upgrade policies available, then in step 570 the upgrade policy of the latest or most recent version V(newest) of the type definition from the type system 140 may be inspected to see whether that type definition version contains a policy for direct upgrade to that latest version from the version instantiated in the object 110. If such a direct upgrade policy or method is provided for by the most recent version V(newest), this policy may be retrieved and applied to the object in step 580. If no direct upgrade policy is provided from the object's current type definition version to the most current type definition version, the optimal upgrade path for the upgrade of the object's type definition from V(n) currently instantiated to V(newest) may be mapped in step 590. This upgrade mapping may further be applied in step 600 to upgrade the object's type definition to the current latest type definition V(newest). In step 600, the selected upgrade policies are retrieved, including their associated upgrade code or script implementing the business process or other calculation changes implemented in the various type definition upgrades, and applied to the object in order from oldest to newest in order to update the object's type definition to the most recent type definition V(newest). In this manner embodiments of the invention may be used to create a serialized version of the object which is valid and meets the definitions, constraints, datatypes, and/or processes of the most recent version of the type definition.

At this point, since the object has been updated to be consistent with the most recent type definition, in step 610 the object's type may be associated with the new latest version of the type definition so that when the object is accessed later, it will be known that the object complies with the most recent type definition, or, if intervening changes to the type definition have been made, it can be determined what upgrade steps or upgrade path is appropriate to again bring the object into compliance with the most recent type definition version. In step 620, the object's serialized form is stored in the database. Finally, embodiments may provide for the instantiation of the object's type according to the upgraded/migrated data model.

Figure 4:
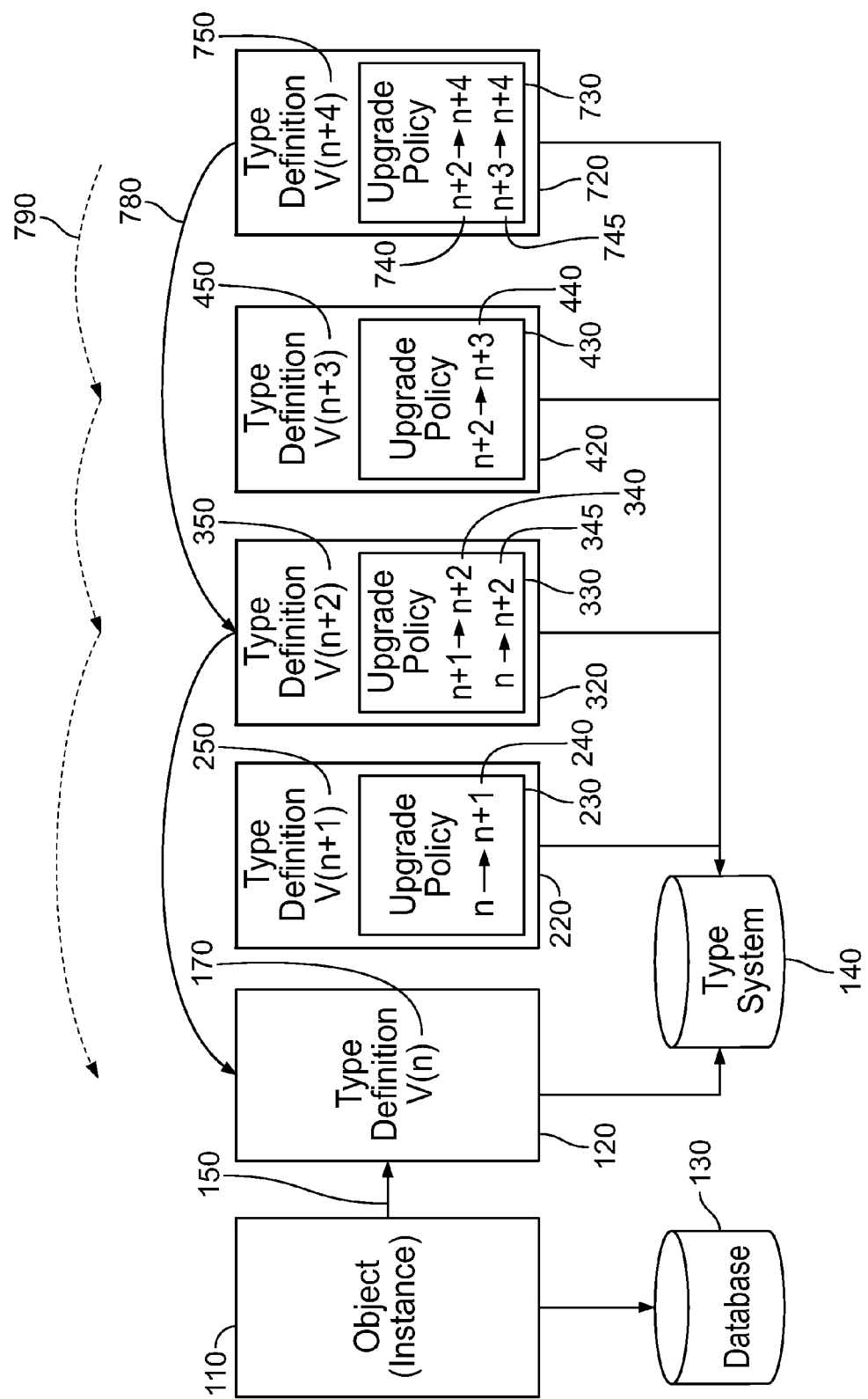
FIG. 4 illustrates a data system in accordance with some embodiments.

An upgrade or modification strategy for versions of the type definition may provide that a type definition upgrade may not occur for a particular object instance for some time, even a very long time, for example in the circumstance that an upgrade policy provides for synchronous upgrade upon access, but the object instance in question is not accessed by users of the data repository for a long time, e.g. because it is not responsive to a user query or is otherwise not relevant or responsive to user activities. It will be appreciated that under such circumstances, the upgrade policy is able to skip versions of the data models, and by the time an upgrade policy provides for an upgrade, more than a single upgrade may be pending against a particular object instance. FIG. 4 illustrates one manner of application of more than a single upgrade policy according to an embodiment of the present invention.

When multiple type definition upgrades are pending simultaneously, it will be appreciated that the set of available upgrade policies may not provide for a direct, or even an indirect, explicit path for upgrade of a type definition. For example, type definition 120 of object instance 110 may not have been effected for a period because the object instance 110 may not have been accessed by a user, while the type definition upgrade policy provides for upgrade synchronously upon access. If successive type upgrade policies for upgrade to V(n+1) 220, V(n+2) 320, V(n+3) 420, and finally to V(n+4) 720 by upgrade policy n+3→n+4 745 all provide for upgrade upon access, but no access occurs during these successive repository upgrades of the type definition 120 generally, at the time that an upgrade policy provides that an upgrade of type definition 120 from type definition version V(n) to type definition version V(n+4) is finally triggered, it may be noted that the administrator may not have provided for a direct upgrade path of type definition 120 from version V(n) 170 to the ultimate current version V(n+4) 720. Instead, only a few subsidiary upgrades may have been provided by the administrator in the meantime, for example upgrade policy V(n)→(n+1) 240, V(n+1)→(n+2) 340, V(n)→(n+2) 345, V(n+2)→(n+3) 440, and upgrade policy V(n+2)→V(n+4) 740, for example. Under this example, then, if at the time that the upgrade of object 110 is triggered according to applicable upgrade policies, the administrator has only implemented upgrade policies up to type definition V(n+2), object instance 110 can be upgraded directly from type definition V(n) 120 to type definition V(n+2) 320 according to upgrade policy V(n)→(n+2) 345. If, on the other hand, the administrator has promulgated upgraded type definition V(n+4) 720, there is no direct upgrade policy; rather, the ultimate upgrade of object instance 110 from type definition V(n) 120 to type definition V(n+4) 720 must take place in a series of steps, according to the available upgrade policies implemented by the administrator.

An embodiment of the invention will provide for a stepwise or multi-stage upgrade of object instance's 110 type definition V(n) 120 according to available type definition upgrade policy. For example, upgrade policy V(n)→(n+2) 345 (i.e. the upgrade policy by which type definition V(n) 120 is upgraded to V(n+2) 320, and subsequently from type definition upgrade policy V(n+2)→(n+4) 740, (i.e., the upgrade policy by which type definition V(n+2) 320 is upgraded to V(n+4) 720), along upgrade path 780. In many embodiments, it may be disadvantageous and suboptimal to follow an upgrade path with more than the fewest number of hops available from any upgrade path. For example, it will be appreciated that there will typically not be any advantage from upgrading type instance 120 according to upgrade policy V(n)→(n+2) 345, then upgrade policy (n+2)→(n+3) 440, and finally according to upgrade policy V(n+3)→(n+4) 745, according to upgrade path 790, as upgrade path 780 can generally be expected to provide the same upgraded type definition for any particular object instance with less overhead and time. However, embodiments of the instant invention may provide the administrator to dictate an optimal update path in order to minimize or optimize overhead and other resources according to the available resources and applicable business processes and repository organization.

For the sake of clarity, the processes and methods herein have been illustrated with a specific flow, but it should be understood that other sequences may be possible and that some may be performed in parallel, without departing from the spirit of the invention. Additionally, steps may be subdivided or combined. While some processes or methods may be described as "expecting," "desiring," or "accepting" certain information or results, or more generally performing an action (e.g. "obtaining"), it will be appreciated by those skilled in the art that that these processes need not be sentient or have consciousness, rather, anthropomorphic language indicating expectations or wishes is intended only to illustrate that the process or method may be typically designed to process or use certain types of arguments or data with certain qualities, and that other arguments or data may result in error, failure, or unexpected or inaccurate results. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for updating one or more data objects stored in a data repository, comprising:

receiving an upgraded type definition, wherein the upgraded type definition is associated with a version identifier, and wherein each of a plurality of data objects stored in the data repository comprises an instance of a type definition that includes at least one data structure indicating one or more data fields associated with the data object;

detecting a user interaction with a first data object;

determining, based at least in part on the version identifier associated with the upgraded type definition, that the upgraded type definition includes a more recent version of the first data object's current data structure; and modifying, based at least in part on one or more update policies, the first data object's current data structure in accordance with the more recent version of the first data object's data structure, wherein modifying, based at least in part on one or more update policies, the first data object's data structure in accordance with a more recent version of the first data object's data structure comprises:

identifying a first set of update policies available from the data repository that effect the more recent version of the first data object's data, identifying a second set of update policies provided by the data repository one or more of which may be applied to effect the update of the first data object's data structure from its current version to a version to which a policy from the first set of update policies may be applied, applying one or more update policies from the second set of update policies to the object's data structure, and applying an update policy from the first set of update policies to the object's data structure.

2. The method as recited in claim 1, wherein the first data object's current data structure is determined at least in part based on a current version identifier associated with the first data object.

3. The method as recited in claim 1, further comprising the step of identifying a subset of the second set of update policies to the first data object's data structure that provides an optimized update path.

4. The method as recited in claim 3, wherein the step of identifying a subset of the second set of update policies minimizes the number of update policies from the second set to be applied.

5. The method as recited in claim 1, further comprising the steps of:
obtaining a serialized form of the first data object from the repository; and
storing the updated serialized form of the first data object in the repository.

6. The method as recited in claim 1, wherein the data structure of the first data object includes services.

7. The method of claim 6, further comprising the step of:
selecting and applying update policies in order to minimize the number of update policies which must be applied to the first data object in order to effect compliance with the upgraded type definition.

8. The method of claim 1, wherein modifying, based at least in part on one or more update policies, comprises selecting and applying a smallest number of update policies necessary to effect update of the object's data structure.

9. The method of claim 1, wherein accessing the first data object comprises accessing a serialized form of the object.

10. The method of claim 9, further comprising storing the modified first data object in serialized form.

11. A system for updating one or more data objects stored in a data repository, comprising a processor configured to:
receive an upgraded type definition, wherein the upgraded type definition is associated with a version identifier, and wherein each of a plurality of data objects stored in the data repository comprises an instance of a type definition that includes at least one data structure indicating one or more data fields associated with the data object;
detect a user interaction with a first data object;
determine, based at least in part on the version identifier associated with the upgraded type definition, that the upgraded type definition includes a more recent version of the first data object's current data structure; and
modify, based at least in part on one or more update policies, the first data object's current data structure in accordance with the more recent version of the first data object's data structure, wherein the processor is configured to modify, based at least in part on one or more update policies, the first data object's data structure in accordance with a more recent version of the first data object's data structure at least in part by:
identifying a first set of update policies available from the data repository that effect the more recent version of the first data object's data;
identifying a second set of update policies provided by the data repository one or more of which may be applied to effect the update of the first data object's data structure from its current version to a version to which a policy from the first set of update policies may be applied;
applying one or more update policies from the second set of update policies to the object's data structure; and
applying an update policy from the first set of update policies to the object's data structure.

12. The system of claim 11, wherein the processor is further configured to identify a subset of the second set of update policies to the first data object's data structure that provides an optimized update path.

13. The system of claim 12, wherein identifying a subset of the second set of update policies minimizes the number of update policies from the second set to be applied.

14. A computer program product for updating one or more data objects stored in a repository, comprising a non-transitory computer readable medium having program instructions embodied therein for:
receiving an upgraded type definition, wherein the upgraded type definition is associated with a version identifier, and wherein each of a plurality of data objects stored in the data repository comprises an instance of a type definition that includes at least one data structure indicating one or more data fields associated with the data object;
detecting a user interaction with a first data object;
determining, based at least in part on the version identifier associated with the upgraded type definition, that the upgraded type definition includes a more recent version of the first data object's current data structure; and
modifying, based at least in part on one or more update policies, the first data object's current data structure in accordance with the more recent version of the first data object's data structure, wherein modifying, based at least in part on one or more update policies, the first data object's data structure in accordance with a more recent version of the first data object's data structure comprises:
identifying a first set of update policies available from the data repository that effect the more recent version of the first data object's data,
identifying a second set of update policies provided by the data repository one or more of which may be applied to effect the update of the first data object's data structure from its current version to a version to which a policy from the first set of update policies may be applied,
applying one or more update policies from the second set of update policies to the object's data structure, and
applying an update policy from the first set of update policies to the object's data structure.

15. The computer program product of claim 14, further comprising computer instructions for identifying a subset of the second set of update policies to the first data object's data structure that provides an optimized update path.

* * * * *